United States Patent [19]

Herbulot et al.

[11] Patent Number: 4,648,498

[45] Date of Patent: Mar. 10, 1987

[54] MOTOR-OPERATED CLUTCH

[75] Inventors: Jean Herbulot, Franconville; Gérard Escaillas, Paris, both of France

[73] Assignee: Valeo, Paris, France

[21] Appl. No.: 849,397

[22] Filed: Apr. 8, 1986

[30] Foreign Application Priority Data

Apr. 17, 1985 [FR] France ................................ 85 05779

[51] Int. Cl.$^4$ ............................................ F16D 19/00
[52] U.S. Cl. ..................................... 192/94; 192/84 R; 192/98; 192/85 C
[58] Field of Search .................... 192/94, 84 R, 110 B, 192/110 R, 98, 85 C, 85 CA, 89 B

[56] References Cited

U.S. PATENT DOCUMENTS

| 2,521,607 | 9/1950 | Rohn | 192/97 |
| 2,571,848 | 10/1951 | Ehlers | 192/67 |
| 4,440,035 | 4/1984 | Foulk | 74/89.15 |

FOREIGN PATENT DOCUMENTS

| 338734 | 1/1927 | Belgium . |
| 686284 | 1/1940 | Fed. Rep. of Germany . |
| 2541793 | 8/1984 | France . |
| 372091 | 5/1932 | United Kingdom . |
| 1188724 | 4/1970 | United Kingdom . |
| 2117076 | 10/1983 | United Kingdom . |
| 2127917 | 4/1984 | United Kingdom . |

Primary Examiner—Carl D. Friedman
Attorney, Agent, or Firm—Charles E. Brown; Charles A. Brown

[57] ABSTRACT

A clutch comprises a casing to which is attached an intermediate member on which is mounted a rotary motor. The outside surface of an axial cartridge on the intermediate member supports and guides an axially mobile actuator. Inside a housing in the cartridge is a screw-and-nut transmission of which either the screw or the nut rotates with the motor while the other is coupled axially to the actuator.

16 Claims, 4 Drawing Figures

MOTOR-OPERATED CLUTCH

BACKGROUND OF THE INVENTION

1. Field of the Invention

The present invention is generally concerned with clutches, especially for automobile vehicles, and is more particularly directed to clutches for large automobile vehicles.

2. Description of the Prior Art

The clutch fitted to a large vehicle is more often than not a mechanical clutch, meaning a clutch which, for clamping a clutch plate against a reaction plate, comprises a spring-loaded mechanism, a diaphram mechanism, for example, with which there is associated a controlling actuator member, usually called the clutch release bearing, movable substantially along its axis.

Given the masses involved and the torque to be transmitted, a high force has always to be applied to operate the clutch of a large vehicle, in other words to move the clutch from its engaged condition with the clutch plate clamped up to its disengaged condition with the clutch plate released, to change the gear ratio, for example. In other words, a high force has always to be applied to the corresponding actuator member to move it axially sufficiently to bring about this change in the state of the clutch.

In practice, this force is more often than not in excess of 500 Newtons.

On a large vehicle the clutch must normally be power-assisted.

Some large vehicles have no onboard source of pressurized fluid (compressed air or hydraulic fluid) to provide such assistance, however.

In this case the clutch is often not a mechanical clutch in the sense defined above, but an electromagnetically operated centrifugal clutch, comprising flyweights responsive to centrifugal force for clamping up a clutch plate.

A major disadvantage of a clutch of this kind is its long response time.

To change the gear ratio takes the time added to energize the electromagnetic part, for the centrifugal part to drop out, for the new gear ratio to be selected, for the electromagnetic part to be de-energized and for the centrifugal part to be deployed.

Overall this may take several seconds.

This may cause problems, especially on slopes, to the detriment of the maneuverability and safety of the vehicle concerned.

Also, given their complexity, electromagnetically operated centrifugal clutches often have the further disadvantage of being relatively costly.

A general object of the present invention is an arrangement enabling these disadvantages to be avoided and thus making it possible to procure under good conditions, especially from the economic point of view, the control of a clutch of a large vehicle with no onboard source of pressurized fluid, while advantageously exploiting specific arrangements usually characterizing a vehicle of this kind.

SUMMARY OF THE INVENTION

The present invention consists in a clutch comprising a casing, an intermediate member attached to said casing, a rotary drive member mounted on said intermediate member, an axial cartridge on said intermediate member, a support and guide member formed by an outside surface of said cartridge adapted to have an axially mobile actuator member disposed on it, a housing within said cartridge, and a screw-and-nut type transmission in said housing comprising a screw element and a nut element of which one is constrained to rotate with said drive member and the other is adapted to be coupled axially to said actuator member.

On large vehicles of the kind in question the clutch is usually located beyond the gearbox relative to the motor, that is to say at the end of the transmission system that the gearbox forms with the motor; because of this, it is possible to attach any form of member axially to its casing as the necessary room is available.

In accordance with the invention, this possiblity is exploited to attach a drive member axially to the casing of the clutch.

This drive member is preferably the output shaft of an electric motor.

On large vehicles of the kind in question, usually equipped with an electromagneticaly operated centrifugal clutch, there is normally provision for electrical lines supplying power to the corresponding electromagnetic operating system. This fact is exploited with advantage.

In accordance with the invention, these electrical lines are used to supply power to the electric motor employed.

Apart from the fact that the screw-and-nut type transmission used features a high load capacity and a long service life in conjunction with compact overall dimensions and great strength, it is advantageously capable of extremely accurate positioning, aligned with great rigidity.

The screw may be made of very fine pitch, in the order of one or a few millimeters, for example. Given that the rotational speed of the output shaft of the electric motor forming the associated drive member is relatively high, in the order of 3,000 to 4,000 revolutions per minute, for example, it is advantageously possible to use a relatively small number or rotations of this output shaft, less than ten such rotations, for example, to procure the axial displacement of the actuator member needed to change from the engaged to the disengaged state of the clutch.

This reduced number of revolutions advantageously results in shorter response times, in the order of a fraction of a second, for example, for the corresponding control function.

The clutch may advantageously be a conventional mechanical clutch, for example a diaphragm type clutch of simpler technology, lighter weight and reduced cost as compared with electromagentically operated centrifugal clutches.

In brief, while satisfying the constraints in respect of overall dimensions, the arrangement in accordance with the invention provides an advantageously simple solution to the problems of operating a clutch on a large vehicle with no onboard source of pressurized fluid, althrough it is to be understood that the field of application of the invention is not necessarily limited to large vehicles.

The characteristics and advantages of the invention will emerge from the following description given by way of non-limiting example only with reference to the accompanying diagramatic drawings.

DESCRIPTION OF THE PREFERRED EMBODIMENT

Figure 1:
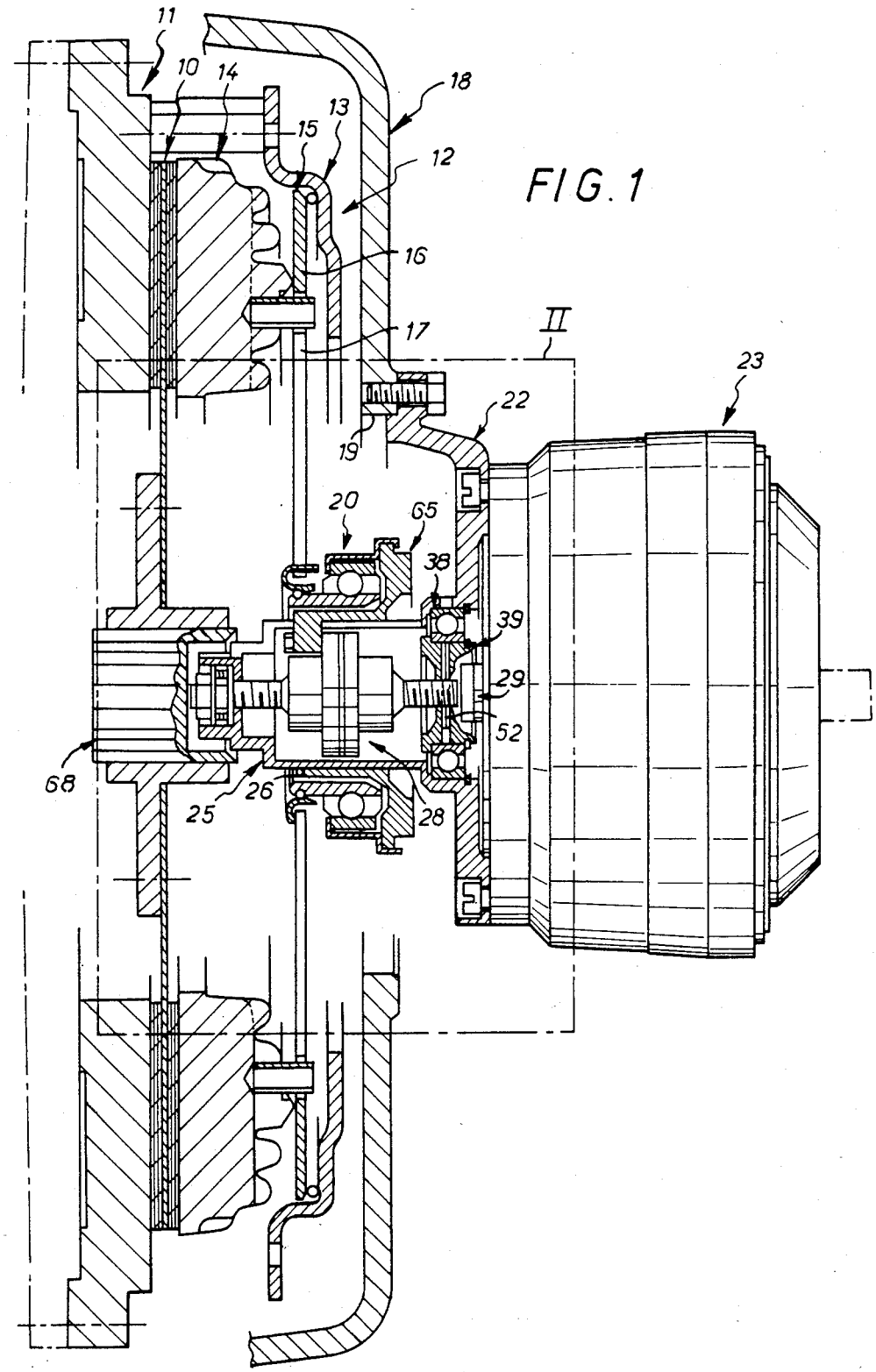
FIG. 1 is a view in axial cross-section of a clutch in accordance with the invention.

These figures illustrate by way of example the application of the invention to a mechanical clutch comprising a diaphragme mechanism 12 for clamping a clutch plate 10 against a reaction plate 11.

As a clutch of this kind is well known in itself and does not of itself form part of the present invention it will not be described in detail here.

It will suffice to point out that its mechanism 12 comprises a plurality of generally annular parts, namely a cover 13 through which it is adapted to be attached, as by screws, for example, to the reaction plate 11, a pressure plate 14 for clamping the clutch plate 10 against the reaction plate 11 and, disposed axially between the cover 13 and the pressure plate 14, a diaphragm 15 whose circumferentially continous peripheral part 16 forms a Belleville washer and urges the pressure plate 14 towards the rection plate 11, bearing on the cover 13, and whose central part 17 is divided into radial fingers by slots and forms the clutch release device adapted to operate the assembly.

In the usual way a clutch of this kind is disposed in a casing 18 in the central part of which is an opening 19.

In the usual way there is associated with a clutch of this kind an actuator member 20 for operating it, usually called the clutch release bearing and movable substantially along its axis.

As a actuator member 20 of this kind is not specific to the present invention it will not be described in detail here.

It will suffice to indicate that in order to operate the clutch, that is to change it from its engaged state with the clutch plate 11 clamped up to its disengaged state with the clutch plate 11 released, the actuator member 20 must operate on the ends of the radial fingers formed by the central part 17 of the diaphragm 15.

Figure 2:
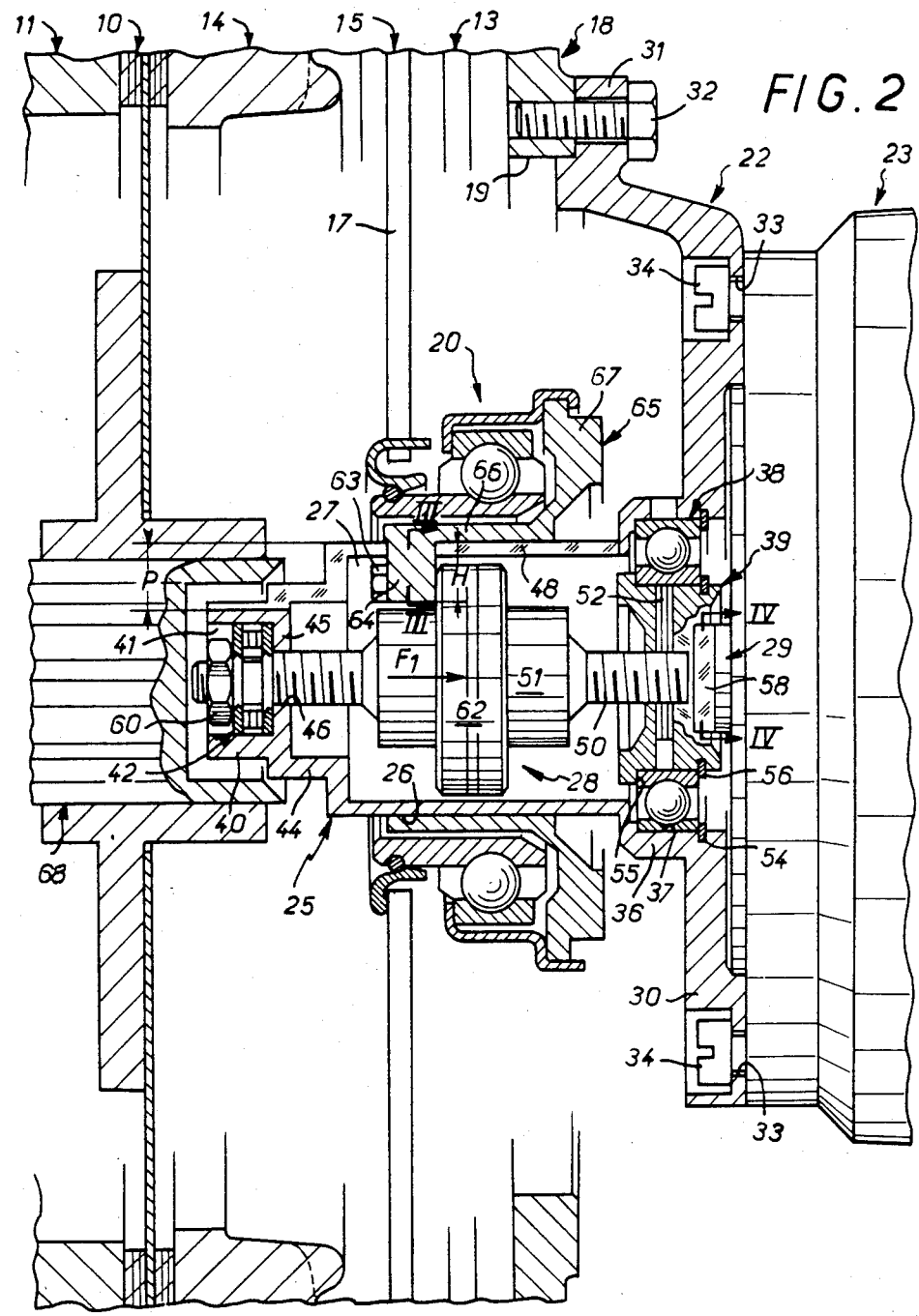
FIG. 2 shows to a larger scale the part of FIG. 1 within a box II thereon.

In the embodiment shown by way of example in the figures, the member 20 operates on the end of the radial fingers of the diaphragm 15 in traction, in other words as schematically shown by the arrow F1 in FIG. 2, in the direction away from the reaction plate 11 and on the side of the diaphragm 15 facing the reaction plate.

In this embodiment the actuator member 20 is a self-centering clutch release bearing in which the self-centering action is maintained.

In accordance with the invention, the clutch further comprises a member 22 referred to hereinafter for convenience as the intermediate member attached to its casing 18, in practice around the central opening 19 in the latter. The intermediate member carries a rotary drive member 29 and features along the axis of the assembly an axial cartridge 25 the outside surface of which forms a support and guide member 26 on which the actuator member 20 is engaged. Its interior volume defines a housing 27 in which there is disposed a scew-and-nut type transmission 28 of which either the screw element or the nut element, as will be specified hereinafter, is constrained to rotate with the drive member 29 whereas the other is coupled axially to the actutor member 20.

In the embodiment shown the drive member 29 is the output shaft of a motor 23 and the intermediate member 22 comprises a transverse flange 30 which, for reasons of easy mounting, has spaced radial lugs 31 along its periphery, for attaching it by one side to the casing 18, as by means of screws 32, for example and as shown, and holes 33 circumferentially distributed in its main part for attaching to its other side, and thus externally of the casing 18, the motor 23, also by means of screws 34, for example.

The associated cartridge 25 projects axially, cantilever-fashion, from the side of the flange 30 opposite the motor 23 and facing the clutch.

The overall shape of the cartridge 25 is that of a body of revolution.

Where is merges with the flange 30 from which it projects it has a larger diameter portion 36 forming a housing 37 in which there is disposed and axially keyed, as will be described in more detail hereinafter, a bearing 38 adapted to center a bearing 39 for the transmission member 28.

A second portion of the cartridge 25, of smaller diameter than the afroementioned portion 36 and forming its main part, constitutes the support and guide member 26 on which the actuator member 20 is engaged.

At the end opposite the flange 30 from which it projects the cartridge 25 has a smaller diameter portion 40 forming a housing 41 in which there is disposed, as will be described in more detail hereinafter, a bearing 42 forming a thrust bearing for the transmission 28.

In the embodiment shown a portion 44 of intermediate diameter extends between this end portion 40 of the cartridge 25 and its main part 26 with, between said intermediate diameter portion 44 and said end portion 40, a transverse wall 45 with an opening 46 in its central area.

This intermediate member 22 may be of unitary construction.

It may instead by formed from two or more shell members appropriately fitted together if required, however.

The cartridge 25 that is comprises features over part at least of its length and for reasons that will emerge hereinafter at least one longitudinal slot 48.

In practice a plurality of longitudinal slots 48 are provided on the cartridge 25, three in number, for example, suitably distributed circumferentally around its axis.

Each of them affects the entire length of the support and guide member 26 that the main part of the cartridge 25 forms.

Preferably, and especially when the intermediate member 22 is of unitary construction, each of the slots 48 in the cartridge 25 is open axially at the free end of the cartridge 25, that is the end thereof opposite the flange 30 from which it projects.

In the embodiment shown, each of the slots 48 thus affects not only the main part 26 of the cartridge 25 but also the intermediate diameter portion 44 thereof and, for part of its thickness, its end portion 40.

P represents the depth of the slot 48 measured between its bottom on the end portion 40 of the cartridge 25 and the outside surface of the support and guide member 26 that constituted its main part.

In practice, the motor 23 employed is an electric motor and the rotary drive member 29 that its output shaft constitutes is substantially aligned with the transmission 28.

In the embodiment shown this transmission 28 is a recirculating roller screw.

A screw of this king being well known in itself and not of itself forming part of the present invention it will not be described here.

It may be, for example, a recirculating roller screw of the type sold under the trade name "TRANSROL".

It will suffice to mention that a screw of this kind comprises an inside element 50 forming a screw interlocking with an outside element 51 forming a nut.

The ends of the screw element 50 are inserted between bearings 39 and 42 and it is keyed to the first of these in the axial direction by a pin 52.

In practice the bearing 39 is itself keyed axially to the bearing 38 which centers it, and which is itself keyed axially to the intermediate member 22 by an elastic ring 54 interlocked therewith, being held between a shoulder 55 on the bearing 39 and an elastic ring 56 interlocked with the bearing 39.

Figure 4:
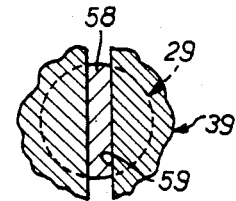
FIGS. 3 and 4 are partial views to the same scale as FIG. 2 in transverse cross-section on the respective lines III—III and IV—IV in FIG. 2.
Figure 3:
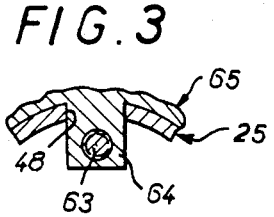

Preferably, and as shown in FIG. 4 in particular, there is a simple rotational link between the screw element 50 of the transmission 28 and the output shaft 29 of the motor 23, of the screwdriver type for example and as shown, excluding any form of axial linkage, in order to reduce the overall axial dimension of the assembly.

In the embodiment shown the output shaft 29 of the motor 23 has a blade-shaped diametral extension 58 by means of which it is axially engaged with a diametral slot 59 of complementary width provided for this purpose on the corresponding face of the bearing 39 with which is interlocked the screw element 50 of the transmission 28.

At the other end of the screw element 50 the bearing 42, which as already mentioned forms a thrust bearing and more precisely an axial thrust bearing of the ball or roller type, for example, is engaged between the wall 45 extending transversely between the end portion 40 of the cartridge 25 and its intermediate diameter portion 44 and a nut 60 screwed onto the other end of the screw element 50 so as to absorb in service the axial reaction force to which the latter may be subjected.

From the foregoing, in the embodiment shown it is the screw element 50 of the transmission 28 which is keyed axially, being engaged between the bearing 39 and the nut 60.

The nut element 51, on the other hand, is free.

In its median part is has a radially projecting flange 62 with arms 64 attached to it by screws 63 from place to place and passing through the cartridge 25 by means of the slots 48 therein, providing the axial link with the actuator member 20.

For example and as shown here these arms 64 may be in one piece with a member 65 forming part of the actuator member 20 and featuring an axial sleeve 66 by means of which it is slidbly engaged on the support and guide member 26 formed by the main part of the cartridge 25 and a transverse flange 67.

In practice the amrs 64 project radially towards the axis of the assembly from the inside surface of the sleeve 66 of this member 65, on the side of the flange 62 of the nut element 51 facing the free end of the cartridge 25, that is towards the end of the cartridge 25 opposite the flange 30 from which it projects.

Their height H as measured from this inside surface is less than the depth P of the slots 38 in the cartridge 25.

Consequently, the cartride 25 may be engaged axially over the part 65 of the actuator member 20 by virtue of the axially open ends of the slots 48.

Given the axial dimension needed for its screw element 50, the transmission 28 passes axially through the actuator member 20 so that the cartridge 25 of the intermediate member 22 extends significantly beyond the diaphragm 15 relative to the motor 23.

In the embodiment shown, its end portion 40 and part of its intermediate diameter portion 44 are axially engaged in the output shaft 68 of the gearbox, which is appropriately hollowed out for this purpose.

In service it is sufficient to supply power to the electric motor 23 for the rotary drive member that its output shaft 29 constitutes to drive the screw element 50 of the transmission 28, the nut element 51 thereof then moving the actuator member 20 axially to change the clutch from the engaged to the disengaged condition.

It is to be understood that the present invention is not limited to the embodiment described and shown, but encompasses any variant execution.

In particular, instead of comprising a recirculating roller screw, the transmission 28 could, for example, be a recirculating ball screw, especially for lower loads.

Also, and as schematically represented in dashed line in FIG. 1, the output shaft 29 of the motor 23 might be provided at the end opposite the drive member 28 with an extension 60 accessible from the outside to enable the transmission 28 to be operated, preferably manually, in the event of failure of the motor 23.

Finally, the field of application of the invention is not limited to that of clutches to the clutch release device of which traction must be applied to cause it to go to the disengaged state, but extends equally to that of clutches to the clutch release device of which a thrust must be applied for this purpose.

There is claimed:

1. Clutch comprising a casing, an intermediate member attached to said casing, a rotary drive member mounted on said intermediate member, an axial cartridge on said intermeidate member, a support and guide member formed by an outside surface of said cartridge adapted to have an axially mobile actuator member disposed on it, a housing within said cartridge, and a screw-and-nut type transmission in said housing comprising a scew element and a nut element of which one is constrained to rotate with said drive member and the other is adapted to be coupled axially to said actuator member.

2. Clutch according to claim 1, wherein said intermediate member comprises a flange which has lugs for attaching it to said casing and from which said cartridge projects.

3. Clutch according to claim 1, wherein over at least part of its length said cartridge has at least one longitudinal slot and further comprising an arm passing radially through said slot and adapted to coupled said actuator member and said screw or nut element axially.

4. Clutch according to claim 3, wherein said slot is open axially at the free end of said cartridge.

5. Clutch according to claim 3, wherein said cartridge has a plurality of circumferentially distributed longitudinal slots.

6. Clutch according to claim 2, wherein at the point where it merges with said flange said cartridge has a larger diameter portion defining a housing in which is disposed and keyed axially a bearing adapted to center a bearing for said transmission.

7. Clutch according to claim 2, wherein at its end opposite said flange said cartridge has a smaller diameter portion defining a housing in which is disposed a bearing forming a thrust bearing for said transmission.

8. Clutch according to claim 1, wherein said transmission is a recirculating roller screw mechanism.

9. Clutch according to claim 1, wherein said nut element is adapted to be coupled axially to said actuator member.

10. Clutch according to claim 1, wherein said drive member is the output shaft of a motor attached to said intermediate member outside said casing and is substantially aligned with said transmission.

11. Clutch according to claim 10, wherien said motor is an electric motor.

12. Clutch according to claim 10, wherein said flange comprises holes for attaching said motor to it.

13. Clutch according to claim 9, wherein said drive member is the output shaft of a motor attached to said intermediate member outside said casing and is substantially aligned with said transmission and there is a simple rotational coupling between said screw element of said transmission and said drive member.

14. Clutch according to claim 1, wherein said transmission is adapted to pass axially through said actuator member.

15. Clutch according to claim 1, wherein said intermediate member is of unitary construction.

16. Clutch according to claim 1, furthe comprising a diaphragm adapted to clamp a clutch plate against a reaction plate and wherein said diaphragm is adapted to cooperate with said actuator member.

* * * * *